US010785397B2

United States Patent
Fukuya et al.

(10) Patent No.: US 10,785,397 B2
(45) Date of Patent: Sep. 22, 2020

(54) INFORMATION PROCESSING SYSTEM, INFORMATION PROCESSING METHOD AND NON-TRANSITORY COMPUTER-READABLE RECORDING MEDIUM ON WHICH INFORMATION PROCESSING PROGRAM IS RECORDED FOR MOVING IMAGE PHOTOGRAPHING, ACQUISITION, AND EDITING

(71) Applicant: OLYMPUS CORPORATION, Hachioji-shi, Tokyo (JP)

(72) Inventors: Yoshiyuki Fukuya, Sagamihara (JP); Kazuo Kanda, Higashiyamato (JP); Kazuhiko Shimura, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 5 days.

(21) Appl. No.: 15/902,732

(22) Filed: Feb. 22, 2018

(65) Prior Publication Data

US 2018/0255226 A1    Sep. 6, 2018

(30) Foreign Application Priority Data

Mar. 2, 2017 (JP) ................................. 2017-039610

(51) Int. Cl.

| H04N 5/232 | (2006.01) |
| H04N 21/2187 | (2011.01) |
| H04N 21/64 | (2011.01) |
| H04N 5/445 | (2011.01) |

(Continued)

(52) U.S. Cl.
CPC ..... *H04N 5/23203* (2013.01); *G06K 9/00711* (2013.01); *G11B 27/00* (2013.01);
(Continued)

(58) Field of Classification Search
CPC ............ G06K 9/00744; G06K 9/00671; G06F 16/783; H04N 21/6405; H04N 21/6408
See application file for complete search history.

(56) References Cited

U.S. PATENT DOCUMENTS

| 7,480,422 B2 * | 1/2009 | Ackley .................... G06K 7/14 |
| | | 382/233 |
| 8,736,681 B2 * | 5/2014 | Matsuzawa .......... G11B 27/034 |
| | | 348/157 |

(Continued)

FOREIGN PATENT DOCUMENTS

JP    2010-154302 A    7/2010

*Primary Examiner* — Ngoc Yen T Vu
(74) *Attorney, Agent, or Firm* — Volpe and Koenig, P.C.

(57) ABSTRACT

An information terminal apparatus includes: a reception section configured to receive images that are a plurality of images which are sequentially sent from an external device using a first communication system and to which information identifying each image is attached; and a transmission section configured to transmit specific information for specifying a specific image among the images which are sequentially sent, to the external device using a second communication system which is different from the first communication system. A movie composed of scenes and images acquired at timings that are desired by users who operate respective information terminal apparatuses is easily obtained.

12 Claims, 13 Drawing Sheets

(51) Int. Cl.

| | | |
|---|---|---|
| *H04W 76/15* | (2018.01) | |
| *G06K 9/00* | (2006.01) | |
| *H04N 21/84* | (2011.01) | |
| *H04N 21/63* | (2011.01) | |
| *G11B 27/00* | (2006.01) | |
| *H04N 21/454* | (2011.01) | |
| *H04N 21/6408* | (2011.01) | |

(52) U.S. Cl.
CPC ... *H04N 5/232939* (2018.08); *H04N 5/44582* (2013.01); *H04N 21/2187* (2013.01); *H04N 21/4542* (2013.01); *H04N 21/632* (2013.01); *H04N 21/64* (2013.01); *H04N 21/84* (2013.01); *H04W 76/15* (2018.02); *G06K 2009/00738* (2013.01); *H04N 21/6408* (2013.01)

(56) References Cited

U.S. PATENT DOCUMENTS

| | | | | |
|---|---|---|---|---|
| 8,855,471 | B2* | 10/2014 | Stone | G11B 27/034 |
| | | | | 386/278 |
| 9,383,904 | B2* | 7/2016 | Lee | G06F 3/04883 |
| 2005/0209995 | A1* | 9/2005 | Aksu | G06F 16/10 |
| 2011/0157218 | A1* | 6/2011 | Ptucha | G06T 11/60 |
| | | | | 345/619 |
| 2012/0288097 | A1* | 11/2012 | Hatayama | G06Q 20/1235 |
| | | | | 380/287 |
| 2017/0285921 | A1* | 10/2017 | Kusumoto | G06F 3/0482 |
| 2018/0024974 | A1* | 1/2018 | Welinder | G06T 5/007 |
| | | | | 715/229 |

* cited by examiner

INFORMATION PROCESSING SYSTEM, INFORMATION PROCESSING METHOD AND NON-TRANSITORY COMPUTER-READABLE RECORDING MEDIUM ON WHICH INFORMATION PROCESSING PROGRAM IS RECORDED FOR MOVING IMAGE PHOTOGRAPHING, ACQUISITION, AND EDITING

CROSS REFERENCE TO RELATED APPLICATION

This application claim is benefit of Japanese Application No. 2017-39610 in Japan on Mar. 2, 2017, the contents of which are incorporated by this reference.

BACKGROUND OF THE INVENTION

1. Field of the Invention

The present invention relates to an information acquisition apparatus, an information terminal apparatus, an information processing system, an information processing method, and a recording medium on Which an information processing program is recorded, which are suitable for moving image photographing, acquisition and editing.

2. Description of the Related Art

In recent years, many portable devices with a photographing function (photographing devices) such as digital cameras include not just a still image photographing function, but also a moving image photographing function. Such photographing devices include devices that also have a function that photographs a still image during moving image photographing.

While a still image is a simple image that can be viewed in a moment, a moving image or continuously shot images (hereunder, referred to as "moving image") require a comparatively long time period to both photograph and view.

In some cases a moving image obtained by performing moving image photographing includes a comparatively large quantity of unnecessary parts or monotonous parts, and has little variation or charm in viewing. Normally, in many cases a moving image that is suited for viewing or observing is obtained by editing a moving image that was obtained by photographing while performing adjustments and the like over a comparatively long time period.

For example, Japanese Patent Application Laid-Open Publication No. 2010-154302 discloses technology that, by including an event acquisition section that acquires event data which is information indicating a scene for each frame of a movie that is acquired by a movie acquisition section, cuts and edits a movie according to cut signals that are based on the event data.

SUMMARY OF THE INVENTION

The present invention provides an apparatus that enables an immediate response with respect to a moving image that has been picked up and sent.

An information terminal apparatus according to one aspect of the present invention includes: a reception section configured to receive images that are a plurality of images which are sequentially sent from an external device using a first communication system and to which information identifying each image is attached; and a transmission section configured to transmit specific information for specifying a specific image among the images which are sequentially sent, to the external device using a second communication system which is different from the first communication system.

An information terminal apparatus according to another aspect of the present invention includes: a reception section configured to receive a series of images which are picked up and sequentially transmitted, and which are images to which information identifying each image is attached; an editing point control section configured to generate editing information for instructing editing of a specific image among the series of images, and which includes information specifying the specific image; and a transmission section configured to transmit the editing information to an external device.

An information acquisition apparatus according to one aspect of the present invention includes: an image pickup section configured to acquire a series of images by picking up images; a transmission section configured to attach information identifying each image to the series of images that the image pickup section acquires and transmit the series of images; a reception section configured to receive editing information for instructing editing of a specific image among the series of images, the editing information including information specifying the specific image; and a recording control section configured to record the series of images that are picked up, and to record the editing information in association with the specific image.

An information processing system according to one aspect of the present invention includes: an image pickup apparatus including an image pickup section configured to acquire a series of images by picking up images, a first transmission section configured to attach information identifying each image to the series of images that the image pickup section acquires and transmit the series of images, a first reception section configured to receive editing information for instructing editing of a specific image among the series of images, the editing information including information specifying the specific image, and a recording control section configured to record the series of images that are picked up and to record the editing information in association with the specific image; and an information terminal apparatus including a second reception section configured to receive the series of images that the first transmission section transmits, an editing point control section configured to generate the editing information, and a second transmission section configured to transmit the editing information to the first reception section.

Further, an information processing method according to one aspect of the present invention includes: a step of acquiring a series of images by picking up images; a step of attaching information that identifies each image to the series of images that are acquired and transmitting the series of images; a step of receiving the series of images that are transmitted; a step of generating editing information for instructing editing of a specific image among the series of images that are received, the editing information including information specifying the specific image; a step of transmitting the editing information; a step of receiving the editing information that is transmitted; and a step of recording the editing information that is received, in association with the picked-up series of images.

Furthermore, a non-transitory computer-readable recording medium on which an information processing program is recorded according to one aspect of the present invention records an information processing program that causes a computer to execute: a step of acquiring a series of images by picking up images; a step of attaching information that identifies each image to the series of images that are acquired and transmitting the series of images; a step of receiving the series of images that are transmitted; a step of generating editing information for instructing editing of a specific image among the series of images that are received, the editing information including information specifying the specific image; a step of transmitting the editing information; a step of receiving the editing information that is transmitted; and a step of recording the editing information that is received, in association with the picked-up series of images.

The above and other objects, features and advantages of the invention will become more clearly understood from the following description referring to the accompanying drawings.

DETAILED DESCRIPTION OF THE PREFERRED EMBODIMENTS

Hereunder, embodiments of the present invention are described in detail referring to the accompanying drawings. Although a movie is composed of a plurality of image frames, the term "image" as used hereunder may, as necessary, refer to a specific image frame or may refer to a group of image frames.

(First Embodiment)

Figure 1:
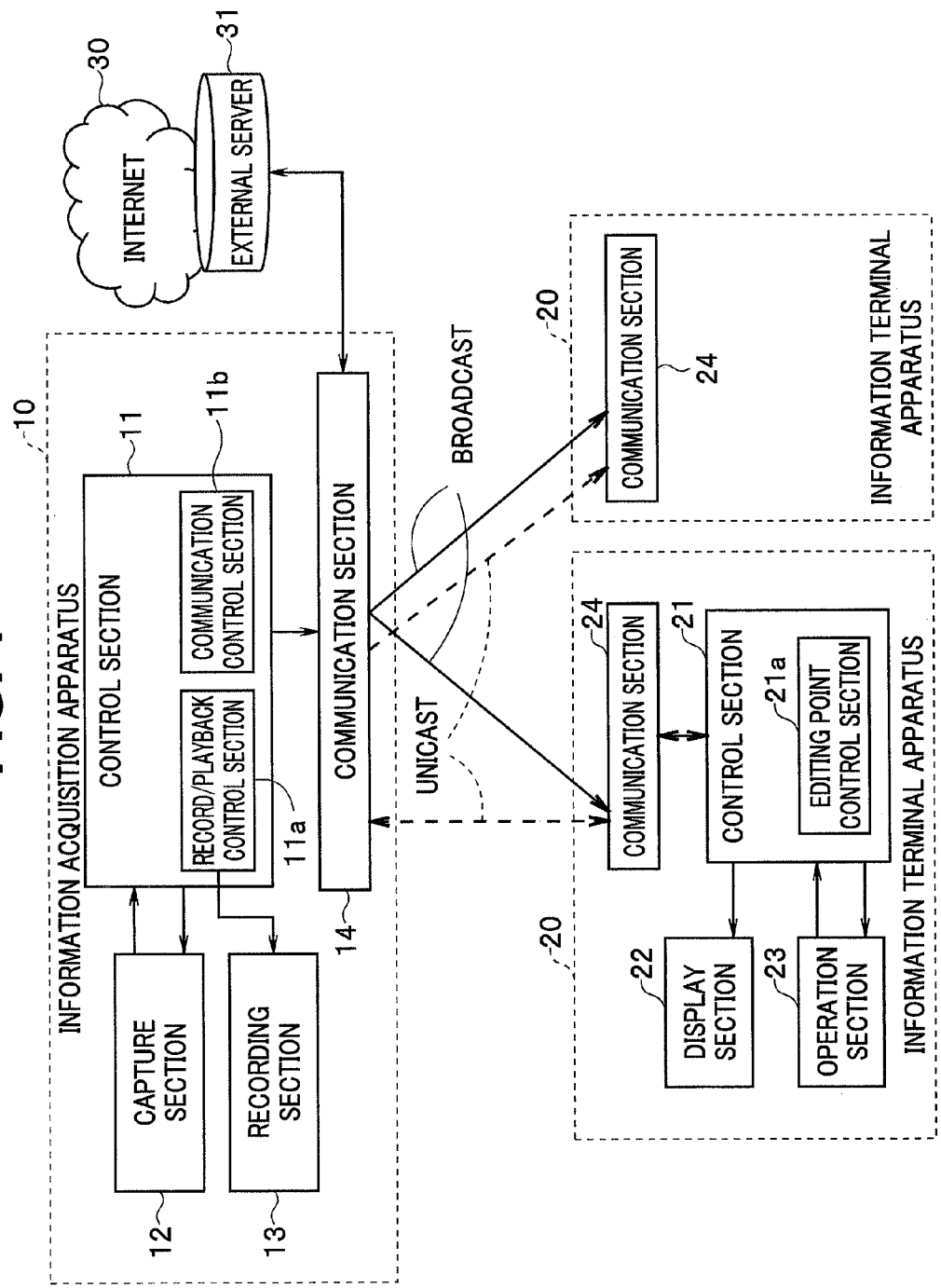
FIG. 1 is a block diagram illustrating an information processing system including an information acquisition apparatus and information terminal apparatuses according to a first embodiment of the present invention.

FIG. 1 is a block diagram illustrating an information processing system including an information acquisition apparatus and information terminal apparatuses according to a first embodiment of the present invention. Note that, although in FIG. 1 an example is illustrated in which an information processing system is composed of one information acquisition apparatus 10 and two information terminal apparatuses 20, the information processing system can be composed of a plurality of information acquisition apparatuses 10 and one or more information terminal apparatuses 20.

The present embodiment obtains a movie that has variation and charm by, for example, adding editing information indicating an editing point at the timing of a preferred scene during moving image photographing, and performing editing utilizing the editing information. In this case, in the present embodiment an operator of an information terminal apparatus other than the photographer of the moving image is allowed to add editing information such as photographing parameter information, timing information and highlight information. By this means, in the present embodiment the photographer of the moving image can be allowed to concentrate on performing the moving image photographing operations, and the occurrence of camera-shake that accompanies operation of an operation member for parameter switching, for performing mode settings or the like as well as the occurrence of mistakes due to a lapse in concentration can be prevented, thereby facilitating the achievement of ideal framing and the like. Further, by making it possible for one or more users who view a moving image after editing to add editing information by a simple operation performed using an information terminal apparatus that the respective users operate, the present embodiment obtains a movie that has been photographed utilizing optimal photographing parameters, image processing and the like that has excellent viewability and observability which reflect the preferences and the like of the users who view and observe the moving image.

In FIG. 1, the information acquisition apparatus 10, for example, can be constituted by a camera or the like. A control section 11 is provided in the information acquisition apparatus 10. The control section 11 may be constituted by a processor that uses a CPU or the like and may control each section by operating in accordance with a program stored in an unshown memory, and a part thereof may be replaced by an electronic circuit composed of hardware. A capture section 12 is provided in the information acquisition apparatus 10. The capture section 12 can be composed of an image pickup device, a microphone and the like, and picks up images of objects to acquire a movie and still images, and acquires ambient sounds. The capture section 12 is configured to be capable of supplying picked-up images and sounds that are acquired to the control section 11.

The control section 11 is configured to be capable of providing picked-up images and sounds acquired by the capture section 12 to a recording section 13 to record the picked-up images and sounds. The recording section 13 is constituted by a predetermined recording medium and can record information provided from the control section 11, and can also read out recorded information and output the information to the control section 11. Note that identification information (hereunder, referred to as "acquisition device information") for identifying the information acquisition apparatus 10 is also recorded in the recording section 13.

A communication section 14 is provided in the information acquisition apparatus 10. The communication section 14 is configured to be capable of transmitting and receiving information to and from another device by wired or wireless communication via an unshown transmission path. The communication by the communication section 14 can be, for example, high-speed communication by means of a wireless LAN such as Wi-Fi (registered trademark), and for example, can also be short-range wireless communication such as communication by Bluetooth (registered trademark). For these kinds of communication, it is possible to select unicasting that is one-to-one communication between devices or a broadcast mode that is one-to-many communication between devices. With respect to mode switching also, the information acquisition apparatus 10 may have a large number of communication sections and share the communication for the respective modes among the communication sections. Although Wi-Fi is suited to transmitting images by communication of a large volume of data, Wi-Fi requires a large amount of electric power, and the connections and settings are time-consuming. On the other hand, although the information amount that Bluetooth communicates is small, a feature of Bluetooth is that it is easy to connect and the electric power consumption is low. In the case of a simple command, sending the command by Bluetooth allows the command to be sent more quickly in comparison to Wi-Fi.

A communication control section 11b is provided in the control section 11. The communication control section 11b is configured to control the communication section 14, and control the transmission of information by the communication section 14. In the present embodiment, the communication control section 11b is configured to be capable of transmitting picked-tip images (movie) acquired by the capture section 12 to outside through the communication section 14, In the present embodiment, when transmitting a movie to outside, the control section 11 is configured to add information for identifying each frame of the movie, for example, frame information such as a frame number, to the movie, and transmit the movie together with the information.

On the other hand, the information terminal apparatus 20 can be constituted by, for example, a smartphone or a tablet terminal. The information terminal apparatus 20 has a control section 21. The control section 21 may be constituted by a processor that uses a CPU or the like, and may control each section by operating in accordance with a program stored in an unshown memory, and a part thereof may be replaced by an electronic circuit composed of hardware. A communication section 24 is provided in the information terminal apparatus 20. The communication section 24 is controlled by the control section 21, and is configured to be capable of transmitting and receiving information to and from the information acquisition apparatus 10 by wired or wireless communication via an unshown transmission path. The communication by the communication section 24 can be, for example, high-speed communication by means of a wireless LAN such as and for example, can also be short-range wireless communication such as communication by Bluetooth.

A display section 22 is provided in the information terminal apparatus 20. The display section 22 is configured to be capable of receiving picked-up images (movie) sent from the information acquisition apparatus 10 through the communication section 24, and of displaying the received movie. An operation section 23 is also provided in the information terminal apparatus 20. The operation section 23 can accept a user operation, and output an operation signal to the control section 21.

An editing point control section 21a is provided in the control section 11. The editing point control section 21a is configured to be capable of, at the timing of an operation signal from the operation section 23, specifying a frame of a movie that has been received through the communication section 24 and is being displayed on the display section 22, and to transmit through the communication section 24 to the information acquisition apparatus 10, for example, editing information that is specific information for specifying, for example, the relevant frame and a plurality of frames in a predetermined period before and after the relevant frame. By this means, a record/playback control section 11a of the information acquisition apparatus 10 is configured to be capable of, when recording a movie in the recording section 13, adding editing information to a frame (specific image) corresponding to the operation timing of the operation section 23 of the information terminal apparatus 20 and recording the added editing information.

The record/playback control section 11a may also contain a function that processes or edits recorded signals. This can be realized by a specific circuit or by a microcomputer and software. With respect to the function mentioned here, it is assumed that the realization of various additional functions is possible, and a configuration may be adopted in which not only is information for extracting an image (image frame) obtained at a specific timing as an image at an optimal timing for viewing and observing outputted and assigned to an image frame or the like, but an image processing function that processes an image or adjusts parameters can also be contained in or linked to the record/playback control section 11a. Further, assignment of identification information that enables sharing of a specific frame or group of frames as a highlight is also enabled.

The communication control section 11b is configured to be capable of controlling the communication section 14 to transmit information recorded in the recording section 13, that is, a movie to which editing information was added, to an external server 31 on the Internet 30. The external server 31 is configured to be capable of performing editing using editing information with respect to a received movie and storing the resultant edited movie. For example, the external server 31 may create a movie by collecting together only frames (specific images) corresponding to timings at which editing information was added. Each information terminal apparatus 20 is configured to be capable of accessing the external server 31 through the communication section 24 to download an edited movie that is recorded on the external server 31, and to be capable of displaying the edited movie on the display section 22.

Note that, although it is described in the foregoing description that editing of a moving image is performed at the external server 31, a configuration may also be adopted in which moving image editing is performed by the control section 11 of the information acquisition apparatus 10 using editing information.

Further, although the foregoing description does not include a description regarding sounds, by operating the operation section 23 of the information terminal apparatus 20 at the timing of a sound which the user likes while listening to sounds during moving image photographing, the user can transmit editing information indicating a period that includes the relevant sound to the information acquisition apparatus 10. In this case, it is possible to obtain a movie that includes sounds that the user desires by editing.

Thus, since sounds can be handled in the same way as images, a description regarding sounds is omitted hereunder.

Next, operations of the embodiment configured as described above will be described.

The capture section 12 picks up images of objects to acquire picked-up images (movie). The capture section 12 provides the acquired movie to the control section 11. The record/playback control section 11a of the control section 11 provides the acquired movie to the recording section 13 to record the acquired movie. Further, the communication control section 11b broadcasts the acquired movie through the communication section 14. For example, the communication control section 11b may resize the acquired movie to reduce the amount of transmitted data, and thereafter broadcast the resized movie utilizing a wireless LAN. When transmitting a movie, the communication control section 11b simultaneously transmits frame information identifying each frame of the relevant movie and acquisition device information.

The communication section 24 of each information terminal apparatus 20 receives the movie that was broadcast. The control section 21 of each information terminal apparatus 20 provides the received movie to the display section 22 to cause the display section 22 to display the movie. The operator of each information terminal apparatus 20 refers to the movie that is displayed on the display section 22, and operates the operation section 23 at the timing of a scene which the operator likes or the like to thereby specify an editing point, that is, a specific image of the movie which is being picked up by the information acquisition apparatus 10.

In this case, by using broadcasting, there is the advantage that image sharing can be performed simultaneously with the devices of a large number of users for an extended time period. Note that communication for broadcasting and communication for unicasting may be switchable, or a different kind of communication may be performed. In the case of unicasting, the need arises to conduct negotiation with the respective devices each time, and hence unicasting is lacking in terms of immediacy. However, it need hardly be said that an application is possible in which unicast communication is conducted with a plurality of devices using a plurality of communication sections.

The operation signal from the operation section 23 is provided to the editing point control section 21a, and the editing point control section 21a generates editing information including frame information at the input timing of the operation signal. The editing information is specific information that specifies a frame, that is, a specific image, of the received movie by means of frame information, and may be information that specifies a frame of the movie corresponding to the input timing of an operation signal, or may be information that specifies frames of the movie corresponding to a predetermined period before and after the input timing of an operation signal.

The control section 21 transmits the editing information to the information acquisition apparatus 10 through the communication section 24. The communication section 24 performs communication by unicasting with respect to the communication section 14 of the information acquisition apparatus 10 to transmit the editing information. For example, the communication section 24 transmits the editing information by Bluetooth. Note that the information acquisition apparatus 10 is configured to perform communication with a plurality of the information terminal apparatuses 20 to acquire editing information regarding desired editing points from each user. Therefore, the communication section 24 suppresses the occurrence of conflicts during communication between the information acquisition apparatus 10 and the respective information terminal apparatuses 20 by ending the communication immediately after transmitting the editing information by unicasting.

That is, unicasting transmits data to a designated specific transmission destination party, and by using unicasting it is possible to perform specific communication that is accompanied by confirmation of definite two-way communication. Further, the transmission of advice or the like is not carried out continuously, but rather is sporadic and does not occupy the communication line. Hence, it is possible to receive advice from a large number of devices using time periods when the communication line is open. In the case of broadcasting or multicasting in which data can be received by a large number of devices, it is possible for unexpected control, interference or the like to arise, however in a case where the utilization scene is one that allows such control, interference or the like, it is not necessary to limit the communication to unicasting.

The record/playback control section 11a of the information acquisition apparatus 10 adds editing information received through the communication section 14 to the movie from the capture section 12. That is, editing information that indicates that a frame specified by the editing information is an editing point is added and recorded. Note that the record/playback control section 11a may record the editing information by including the editing information in the movie file or may record the editing information in a separate file from the movie.

Thus, a movie to which is added editing information for editing at timings desired by users that operate the respective information terminal apparatuses 20 is recorded in the recording section 13. Accordingly, by editing the movie using the editing information that is added to the movie, a movie is obtained that is composed only of scenes or images captured at the timings desired by respective users.

For example, by using the editing information, a separate moving image in which scenes desired by all the users are collected together can be easily created, and separate moving images in which scenes desired by each of the respective users or by predetermined users are collected together can be easily created. In addition, a specific image frame can be processed, subjected to parameter adjustment, or shared as a highlight.

When the moving image recording ends, the control section 11 uploads the movie to which the editing information is added to the external server 31 on the Internet 30 through the communication section 14. The external server 31 records the uploaded movie, and also edits the movie using the editing information and records the edited movie.

The users who operate the information terminal apparatuses 20 perform an operation to download the edited movie that is recorded on the external server 31. By this means, the edited movie is received through the communication section 24, and is displayed on the display section 22 by the control section 21.

Thus, in the present embodiment, editing information is generated based on operations of users who operate respective information terminal apparatuses while watching a movie that is broadcast from an information acquisition apparatus, and the editing information is added to the movie and recorded during photographing. By performing editing using the editing information, it is possible to carry out the moving image editing in a short time period. By this means, a movie composed of scenes or images captured at the timings desired by users operating respective information terminal apparatuses can be easily obtained. Since it is not necessary for the photographer that uses the information acquisition apparatus to perform any kind of editing work, and the photographer can therefore concentrate on the moving image photographing operations, the occurrence of camera-shake that accompanies operation of an operation member for adjusting or setting parameters, for performing mode switching settings or the like as well as the occurrence of mistakes due to a lapse in concentration can be prevented, and the achievement of ideal framing and the like is also facilitated. Further, since a user who is viewing the moving image can perform an operation to decide an editing point, a moving image can be obtained that has excellent viewability and observability in which the preferences and the like of the users who view and observe the moving image are reflected.

(Second Embodiment)

Figure 2:
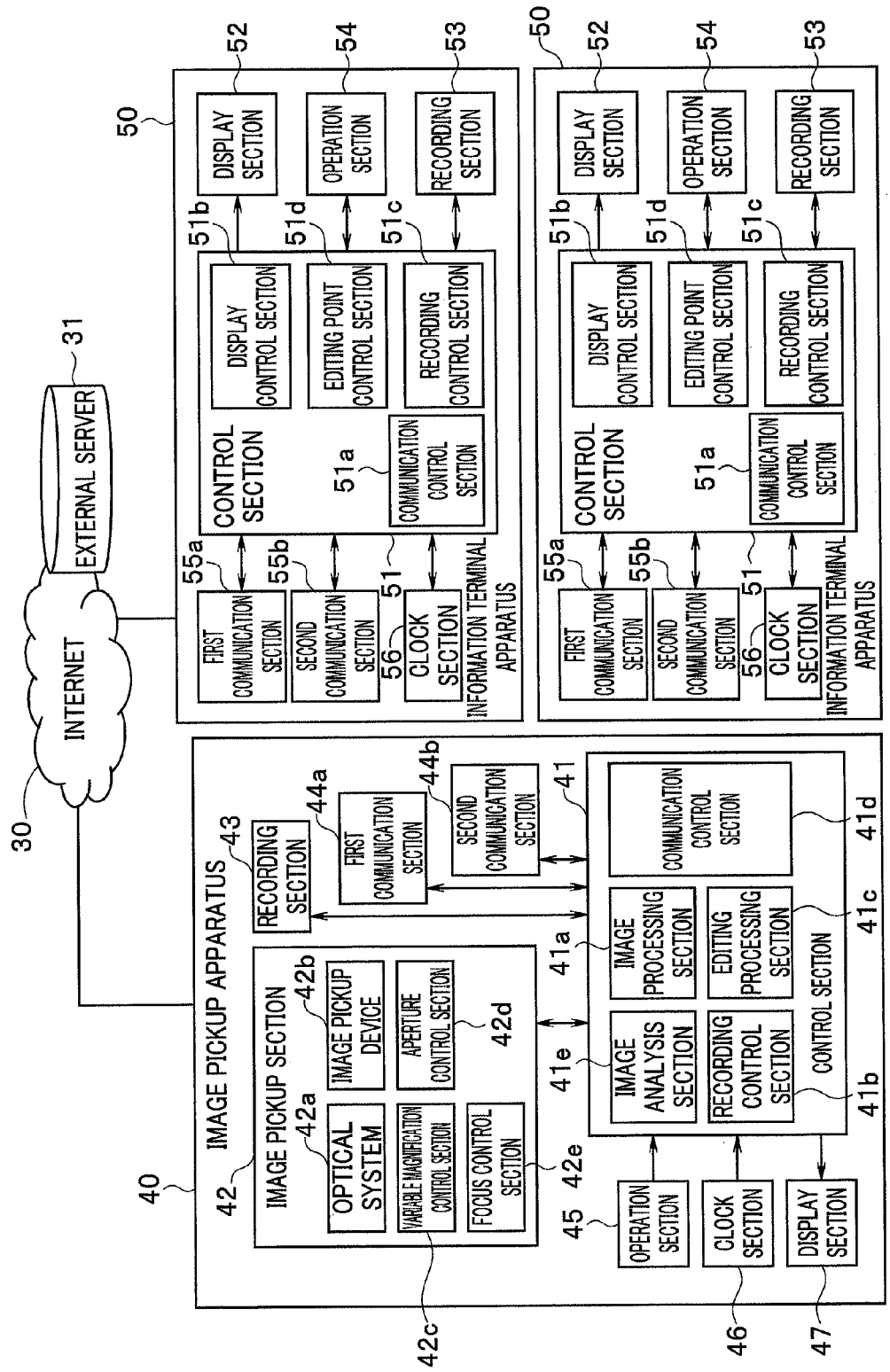
FIG. 2 is a block diagram illustrating a second embodiment of the present invention.

FIG. 2 is a block diagram illustrating a second embodiment of the present invention. More specifically, FIG. 2 is a block diagram illustrating an information acquisition apparatus and information terminal apparatuses. In the present embodiment, a case is illustrated in which an image pickup apparatus 40 is adopted as an information acquisition apparatus. Note that, with respect to FIG. 2 also, although a case is illustrated in which an information processing system is constituted by one image pickup apparatus 40 and two information terminal apparatuses 50, the information processing system can be constituted by a plurality of image pickup apparatuses 40 and one or more information terminal apparatuses 50.

In FIG. 2, a control section 41 is provided in the image pickup apparatus 40. The control section 41 may be constituted by a processor that uses a CPU and the like, and may control each section by operating in accordance with a program stored in an unshown memory, and a part thereof may be replaced by an electronic circuit composed of hardware.

The image pickup apparatus 40 includes an image pickup section 42 which includes an image pickup device 42b such as a CCD or CMOS sensor. The image pickup section 42 acquires an image pickup signal (picked-up image) by subjecting an optical image that is incident via an optical system 42a to photoelectric conversion by means of the image pickup device 42b. In the optical system 42a, an unshown zoom (variable magnification) mechanism, aperture and focus mechanism are provided Which are configured to be subjected to driving control by a variable magnification control section 42c, an aperture control section 42d and a focus control section 42e, respectively.

The control section 41 is configured to be capable of controlling the variable magnification control section 42c, the aperture control section 42d and the focus control section 42e to adjust the zoom, aperture and focus of the optical system 42a.

The operation section 45 includes an unshown release button and function buttons, and various switches, dials and ring members or the like for photographing mode setting and parameter operations, and as necessary may also include a touch panel or the like, and outputs operation signals based on user operations to the control section 41. The control section 41 is configured to control the respective sections including the image pickup section 42 based on operation signals from the operation section 45. The image pickup apparatus 40 also includes a clock section 46. The clock section 46 can generate time information and supply the time information to the control section 41.

The control section 41 outputs a driving signal for the image pickup device to the image pickup section 42, and also takes in picked-up images (movie and still images) from the image pickup section 42. An image processing section 41a of the control section 41 performs predetermined signal processing on the picked-up images that are taken in, for example, the control section 41 performs color adjustment processing, matrix conversion processing, noise elimination processing and various other kinds of signal processing.

The control section 41 can provide picked-up images that have undergone signal processing to a display section 47 to display the picked-up images. The display section 47, for example, is provided on the rear face of the case of the image pickup apparatus 40, and includes a display screen such as an LCD (liquid crystal display), and displays images that are provided by the control section 41. Note that the control section 41 is configured to also be capable of displaying various menu displays, message displays and the like on the display screen of the display section 47.

A record control section 41b of the control section 41 can subject a photographed image that underwent signal processing to compression processing, and provide the compressed image to a recording section 43 to cause the recording section 43 to record the compressed image. For example, a card interface can be adopted as the recording section 43, and the recording section 43 is capable of recording image information, audio information and the like on a recording medium such as a memory card. The record control section 41b is also capable of reading out information that is recorded by the recording section 43, and outputting the information to the control section 41.

In the present embodiment, a communication control section 41d is provided in the control section 41. The communication control section 41d is configured to be capable of controlling a first communication section 44a and a second communication section 44b to perform sending and receiving of information to and from external devices. The first communication section 44a is, for example, capable of communication by means of short-range wireless communication such as Bluetooth (hereunder, communication through the first communication section 44a is also referred to as "first communication"), and the second communication section 44b is, for example, capable of communication by a wireless LAN such as Wi-Fi (hereunder, communication through the second communication section 44b is also referred to as "second communication"). Note that the first communication and the second communication are not limited to Bluetooth and Wi-Fi, and it is possible to adopt communication by various kinds of communication systems.

The communication control section 41d broadcasts a movie acquired by the image pickup section 42, through the second communication section 44b. For example, the communication control section 41d may resize the acquired movie to reduce the amount of transmission data, and thereafter broadcast the resized movie utilizing a wireless LAN. When transmitting the movie, the communication control section 41d is configured to simultaneously transmit frame information identifying each frame of the movie and acquisition device information identifying its own device.

In the present embodiment, an image analysis section 41e is provided in the image pickup apparatus 40. The image analysis section 41e is configured to subject picked-up images (movie and still images) to image analysis, and cause the analysis results to be recorded in association with frames of the picked-up images. When recording the picked-up images, the record control section 41b records the analysis results of the image analysis section 41e in association with the frames. For example, by means of the image analysis section 41e it is possible to judge a scene in a movie, and it is also possible to judge the orientation or expression of the face of a person in an image. For example, the orientation or expression of the face of a person in each frame in a moving image can be ranked and recorded together with the moving image.

In the present embodiment, an editing processing section 41c is provided in the control section 41. The editing processing section 41c is provided with editing information that specifies frames of a moving image to be recorded as well as editing contents from an information terminal apparatus 50 that is described later, and is configured to add the editing information to corresponding frames of the moving image to be recorded. The record control section 41b is controlled by the editing processing section 41c to add editing information to specified frames when recording a movie to the recording section 43.

Note that, as described later, a configuration is adopted so that, when receiving editing information, editor information identifying the device that transmitted the relevant editing information or the user that operated the device as well as operation time information showing the time the relevant editing information was created are also simultaneously received, and the record control section 41b is configured to also add the editor information and the operation time information to the image of the corresponding frame together with the editing information and to record the image with the added information.

Further, the editing processing section 41c can playback a moving image that was read out from the recording section 43 based on the editing information. In addition, the editing processing section 41c is configured to also be capable of editing the moving image that was read out based on editing information, and record the edited moving image in the recording section 43. Further, the editing processing section 41c is configured to be capable of causing the edited moving image to be transmitted to the information terminal apparatus 50 or to the external server 31 on the Internet 30 through the communication control section 41d.

The information terminal apparatus 50 can be constituted by, for example, a smartphone or a tablet terminal. The information terminal apparatus 50 includes a control section 51. The control section 51 may be constituted by a processor that uses a CPU or the like, and may control each section by operating in accordance with a program stored in an unshown memory, and a part thereof may be replaced by an electronic circuit composed of hardware. A first communication section 55a and a second communication section 55b are provided in the information terminal apparatus 50. The first communication section 55a is capable of first communication by, for example, short-range wireless communication such as Bluetooth. The second communication section 55b is capable of second communication by means of, for example, a wireless LAN such as Wi-Fi.

A communication control section 51a is provided in the control section 51. The communication control section 51a is configured to control the first and second communication sections 55a and 55b to carry out the transmission and reception of information to and from the image pickup apparatus 40. In the present embodiment, by means of the second communication section 55b, the communication control section 51a receives a movie that was transmitted by broadcasting from the second communication section 44b of the image pickup apparatus 40. Further, the communication control section 51a is configured to transmit editing information generated at an editing point control section 51d, described later, from the first communication section 55a to the first communication section 44a of the image pickup apparatus 40 by unicasting.

A display control section 51b of the control section 51 executes various kinds of display-related processing. The display control section 51b can supply a received movie to a display section 52. The display section 52 includes a display screen such as an LCD, and displays a movie that is provided from the display control section 51b. The display control section 51b is also configured to cause various menu displays, and the like to be displayed on the display screen of the display section 52.

An operation section 54 can generate an operation signal based on a user operation, and output the operation signal to the control section 51. Note that an unshown touch panel that is arranged on the display screen of the display section 52 can be adopted as the operation section 54. The touch panel can generate an operation signal corresponding to a position on the display screen that a user indicates using a finger. The operation signal is supplied to the control section 51. Thus, when the user touches or slides a finger on the display screen, the control section 51 can detect the relevant operation. That is, the control section 51 is configured to be capable of detecting a position that a user touches, and various operations such as an operation in which the user brings fingers close together and then separates the fingers (a pinching operation), a slide operation and a position reached by the slide operation, a slide direction and the duration of a touch operation, and can perform processing corresponding to the user operation. The clock section 56 can generate time information and supply the time information to the control section 51.

A recording control section 51c is provided in the control section 51. The recording control section 51c is configured to be capable of providing a movie that is received through the first communication section 55b to a recording section 53 to cause the recording section 53 to record the movie. For example, a flash memory can be adopted as the recording section 53. The recording section 53, for example, can record a movie consisting of a plurality of frames. The recording control section 51c can also read out a movie that is recorded in the recording section 53. Note that editor information for identifying the information terminal apparatus 50 or the operator (user) thereof is also recorded in the recording section 53.

In the present embodiment, the editing point control section 51d is provided in the control section 51. The editing point control section 51d is configured to be capable of specifying a frame of a movie that is received through the first communication section 55b and is displayed on the display section 52 as an editing point based on an operation signal from the operation section 54. For example, the editing point control section 51d generates editing information that includes a frame of an image that is currently being displayed on the display section 52 and frame information indicating a plurality of frames in a predetermined period before and after the relevant frame.

In the present embodiment, the editing information may not only be information with which a user directly specifies a scene or frame that the user wishes to adopt during moving image editing, but may also be information with which a user indirectly specifies a scene or frame that the user wishes to adopt during moving image editing by means of a facial expression in an image or the like. Further, the editing information may include information specifying various forms of editing and information indicating editing contents with respect to a frame that are adopted in the moving image editing. For example, the editing information may be not only information specifying a preferred scene, but also information for requesting still-image playback or special-effects playback. In addition, the editing information may be a request relating to recording or playback processing. For example, the editing information may be information for conveying a desire of a user regarding the brightness during recording to the photographer.

That is, the term "edit" as used in the present application includes various processing concepts for improving the attractiveness of a specific image (including the specific frame itself, and the ease of viewing and observation including the process of arriving at the specific frame), and a design is adopted that enables these to be shared among a plurality of devices.

When the editing point control section 51d generates editing information including frame information specifying a frame, the editing point control section 51d provides the generated editing information to the first communication section 55a and causes the first communication section 55a to transmit the generated editing information to the image pickup apparatus 40. Note that the editing point control section 51d is configured so that, when generating editing information, the editing point control section 51d can generate thumbnail images of a movie recorded in the recording section 53 and display the thumbnail images on the display section 52 to thereby facilitate selection of a frame as an editing point by the user.

The first communication section 55a, for example, transmits the editing information to the first communication section 44a by unicasting. Note that, to suppress the occurrence of conflicts in communication between a plurality of information terminal apparatuses 50 and the image pickup apparatus 40, the first communication section 55a disconnects the connection with the first communication section 44a after transmitting the editing information.

Figure 3:
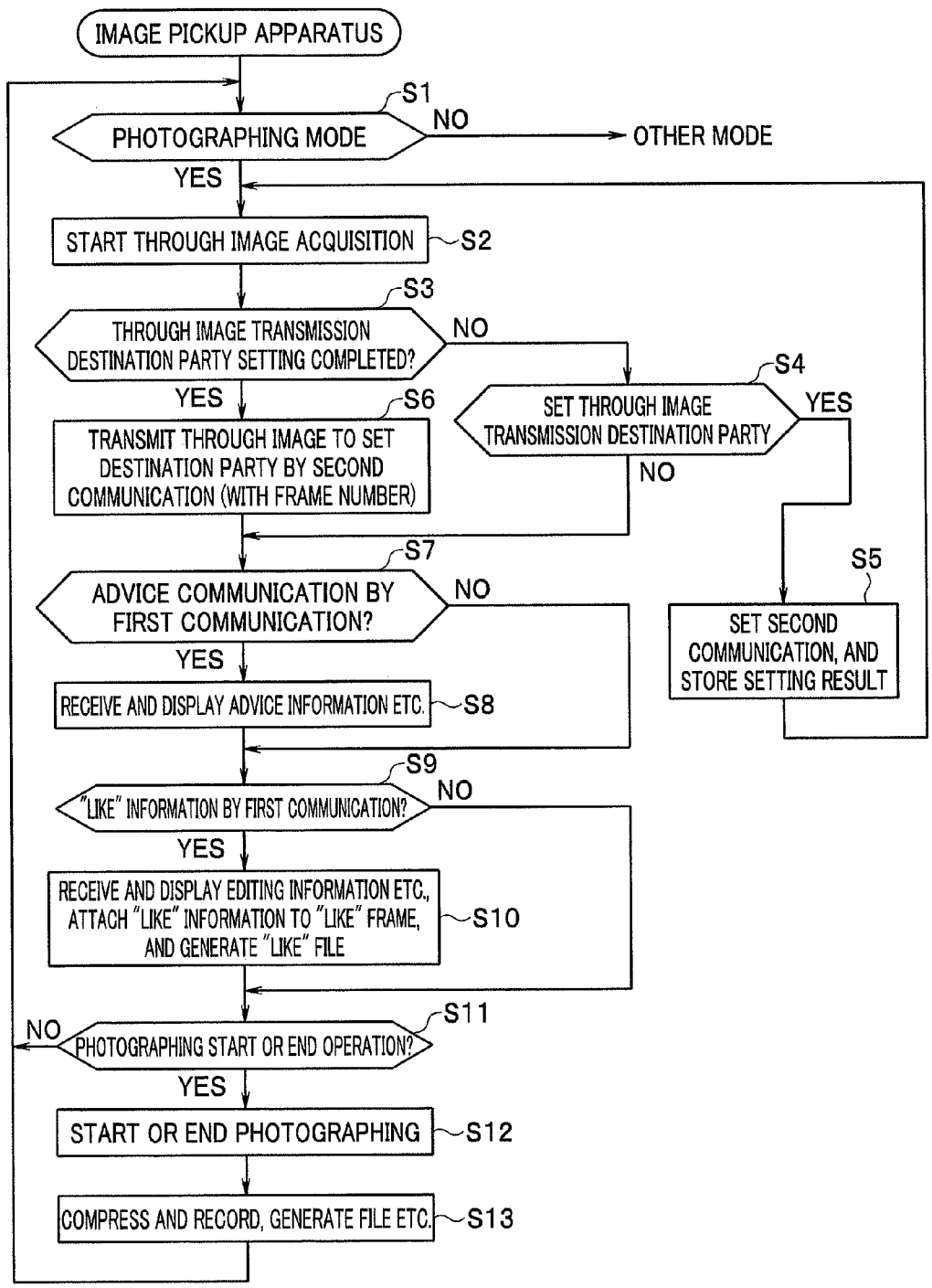
FIG. 3 is a flowchart for describing operations of the second embodiment.
Figure 4:
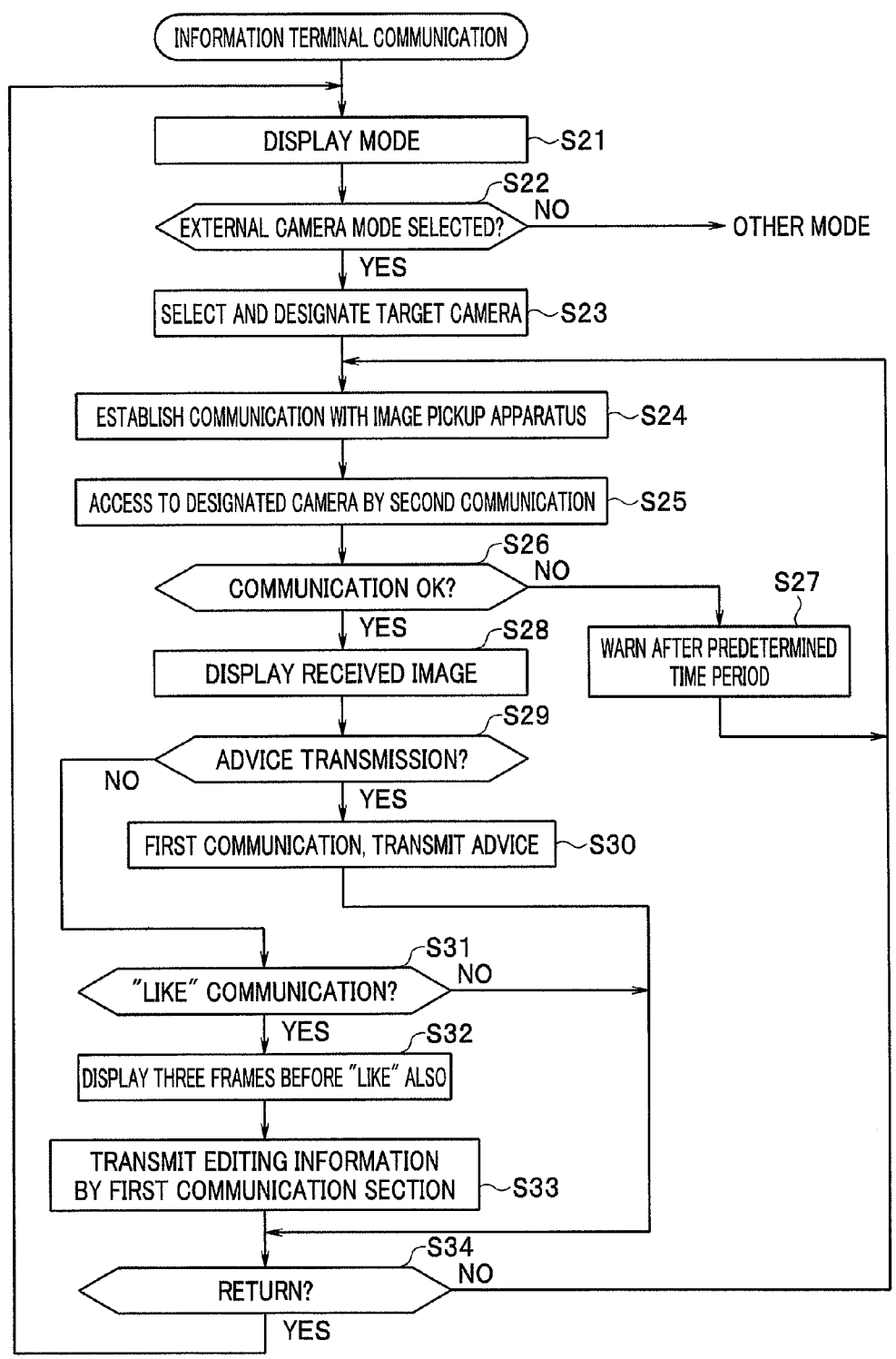
FIG. 4 is a flowchart for describing operations of the second embodiment.

Next, operations of the embodiment that is configured as described above are described referring to FIG. 3 to FIG. 12. FIG. 3 and FIG. 4 are flowcharts for describing operations of the second embodiment, of which FIG. 3 illustrates operations of the image pickup apparatus 40 and FIG. 4 illustrates operations of the information terminal apparatus 50.

The present embodiment is a particularly useful system for a case where, not only one or more photographers that are performing moving image photographing but also one or more users that are viewing the moving image are present at the same time at the scene where the moving image photographing is being performed. Conceivable examples of such a scene include various kinds of events such as wedding ceremonies. In the following description, a wedding ceremony is described as an example. For example, several of the invited guests at a wedding ceremony each perform moving image photographing using their respective image pickup apparatuses 40, and several of the invited guests, for example, specify scenes that they each prefer using their respective information terminal apparatuses 50.

(Time of Moving Image Photographing)

Figure 5A:
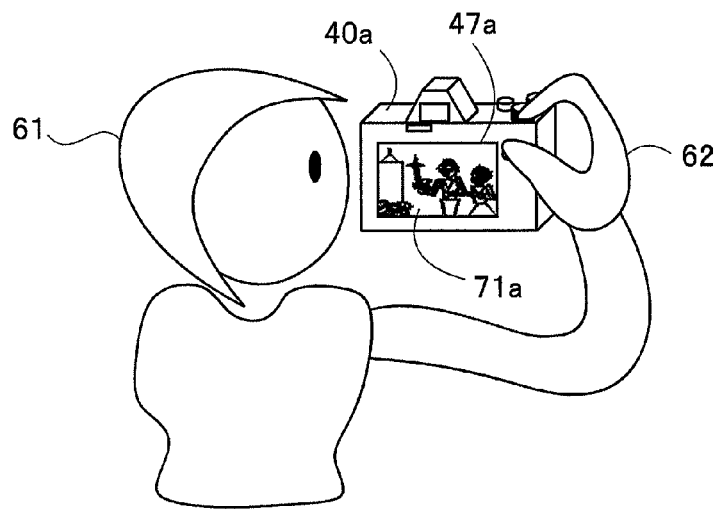
FIG. 5A is an explanatory diagram for describing operations of the second embodiment.
Figure 5B:
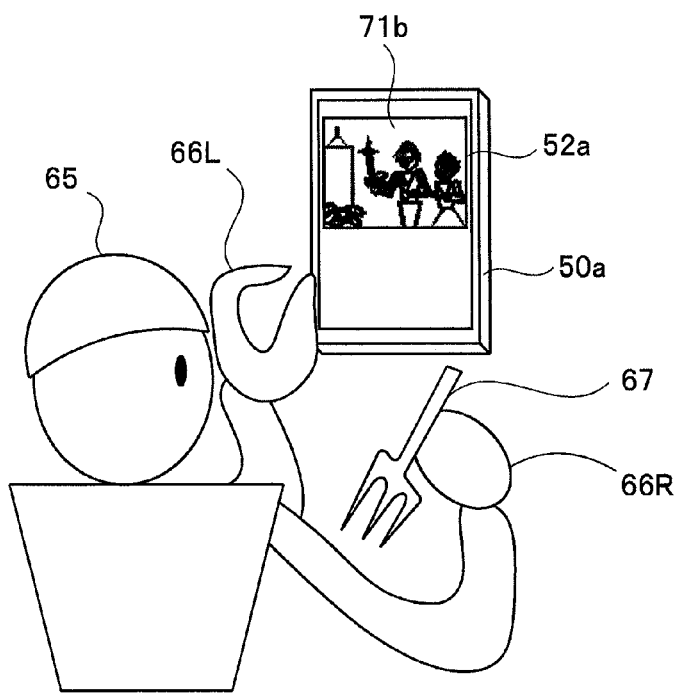
FIG. 5B is an explanatory diagram for describing operations of the second embodiment.

FIG. 5A and FIG. 5B are views for describing operations of the second embodiment, of which FIG. 5A is an explanatory diagram illustrating a situation in which moving image photographing is being performed during a wedding ceremony, and FIG. 5B is an explanatory diagram illustrating a situation in which an editing operation is being performed with respect to the moving image photographing of FIG. 5A. As illustrated in FIG. 5A, a display screen 47a of the display section 47 is provided on the rear face of a case 40a of the image pickup apparatus 40. A user 61 who is a photographer holds the case 40a, for example, in the right hand 62 and performs photographing while watching the display screen 47a of the display section 47 in a state in which the object is captured in the field of view range.

In step S1 of FIG. 3, the control section 41 of the image pickup apparatus 40 determines whether or not the photographing mode is set. If the photographing mode is not set, the control section 41 executes the other mode that is set. If the photographing mode is set, in the subsequent step S2, the control section 41 starts acquisition of a through image. That is, the control section 41 controls the variable magnification control section 42c, the aperture control section 42d and the focus control section 42e based on operations performed on the operation section 45 by the photographer to thereby adjust the zoom, aperture and focus. An object optical image is incident on a light-receiving surface of the image pickup device 42b through the optical system 42a, and the image pickup section 42 thereby acquires a picked-up image. The picked-up image is read out by the control section 41 and subjected to image processing by the image processing section 41a, and is thereafter supplied to the display section 47. In this way, a through image is displayed on the display screen 47a of the display section 47. Note that FIG. 5A illustrates a state in which a through image 71a is displayed on the display screen 47a.

FIG. 6A to FIG. 6E are explanatory diagrams illustrating examples of screen displays in the second embodiment. In step S21 in FIG. 4, at the information terminal apparatus 50, the control section 51 performs an operation to show a mode display.

Figure 6A:
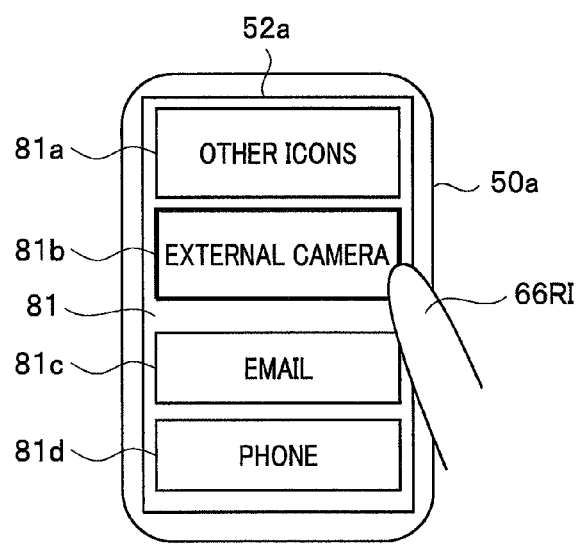
FIG. 6A is an explanatory diagram illustrating an example of a screen display in the second embodiment.

FIG. 6A illustrates an example of a mode display 81. The mode display 81 that is displayed on a display screen 52a includes an icon 81a for activating various applications, a button 81b that selects an external camera mode, a button 81c that selects an email mode, and a button 81d that selects a telephone mode.

Next, in step S22, the control section 51 determines whether or not the external camera mode has been selected. When the user performs a tap operation on the button 81b using a finger 66RI the control section 51 determines that the external camera mode was specified. Further, in order to indicate the selected mode, the display control section 51b displays the button 81b differently to the other buttons. In the examples illustrated in FIG. 6A to FIG. 6E, modes that are not selected are indicated by a solid-line frame surrounding the respective buttons, and the selected mode is indicated by a thick-line frame surrounding the button. In the example in FIG. 6A, it is shown that the external camera mode is selected. In the next step S23, the control section 51 selects the image pickup apparatus 40 to designate the image pickup apparatus 40 as an external camera.

Figure 6B:
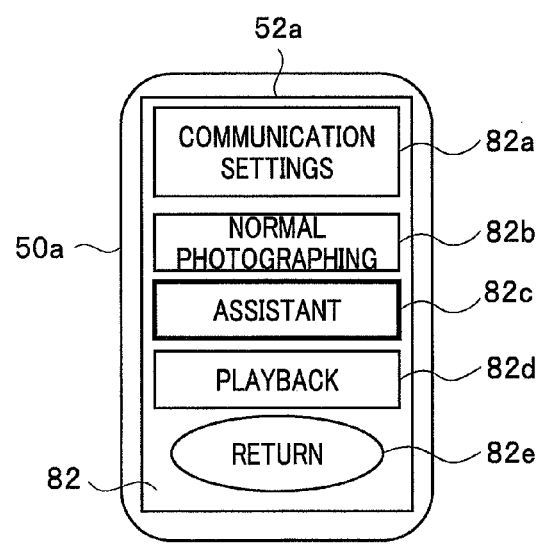
FIG. 6B is an explanatory diagram illustrating an example of a screen display in the second embodiment.

FIG. 6B illustrates an example of an external camera mode display 82. The external camera mode display 82 that is displayed on the display screen 52a includes a button 82a for making communication settings, a button 82b for instructing normal photographing, a button 82c for executing an assistant function, a button 82d for instructing playback, and a button 82e for returning to the mode display 81.

In this case, it is assumed that, in order to participate in editing processing of the movie that is being photographed, the button 82c for executing the assistant function is tapped. The control section 51 of the information terminal apparatus 50 transitions to step S24 that is the next step after step S23, and attempts to establish communication with the image pickup apparatus 40 by means of the communication control section 51a. If communication is established, the communication control section 51a accesses the designated camera (image pickup apparatus 40) by means of the second communication section 55b (step S25), and determines whether or not communication is possible (step S26). If the communication control section 51a determines in step S26 that communication is not possible, the operation transitions to step S27 to issue a warning after a predetermined time period. For example, a warning such as "Cannot Connect" is displayed on the display screen 52a.

The control section 41 of the image pickup apparatus 40 transitions from the processing of step S2 to the processing of step S3 to determine whether or not setting of a through image transmission destination party has been completed. If the setting has not been completed, in step S4 the control section 41 determines whether or not the current mode is the settings mode, and if the current mode is not the settings mode the control section 41 shifts the processing to step S7. If the current mode is the settings mode, in step S5 the control section 41 performs communication settings (second communication settings) for the second communication section 55b to set the through image transmission destination party.

In this case, by utilizing a communication system (second communication section) that is different from the first communication, a rapid response is enabled without performing complex processing that causes additional signals to be superimposed on the first communication during receiving of moving images.

Note that, although the control section 41 may transmit the through image only to a specific destination party, in consideration of the fact of receiving editing information from a plurality of the information terminal apparatuses 50, it is favorable to transmit the through image by broadcast transmission. Therefore, in the setting in step S5, setting of a network ID for or the like, settings for performing broadcast transmission and the like are performed.

In step S3, if the communication control section 41d determines that setting of a through image transmission destination party has been completed, in step S6 the communication control section 41d transmits the through image to the communication destination party by means of second communication settings. As described above, for example, the through image is transmitted by broadcast transmission. Note that, in this case, when transmitting a moving image, the communication control section 41d adds frame information (for example, frame numbers) for identifying each frame of the moving image that is transmitted and acquisition device information for identifying the image pickup apparatus 40 that is transmitting the moving image to the moving image and transmits the moving image together with the added information.

If the communication control section 51a of the information terminal apparatus 50 determines in step S26 that communication is possible, in step S28 the communication control section 51a receives the through image and causes the through image to be displayed on the display screen 52a. FIG. 5B illustrates an example of the display. FIG. 5B illustrates an example that corresponds to FIG. 5A, in which a case 50a of the information terminal apparatus 50 is being held by a left hand 66L of a user 65. The display screen 52a of the display section 52 is provided on an operation screen of the case 50a of the information terminal apparatus 50. The user 65 is, for example, one of the invited guests at the wedding ceremony. In FIG. 5B, an example is illustrated in which the user 65 is holding a fork 67 in the right hand 66R and is watching a through image 71b that is displayed on the display screen 52a of the information terminal apparatus 50 while eating.

The through image 71b that corresponds to the through image 71a which is picked up and displayed by the user 61 who is the photographer is displayed on the display screen 52a of the information terminal apparatus 50. Note that, although in some cases the through image 71b is an image obtained by resizing the through image 71a, the through image 71b makes it possible to check the movie that is currently being photographed.

Figure 6C:
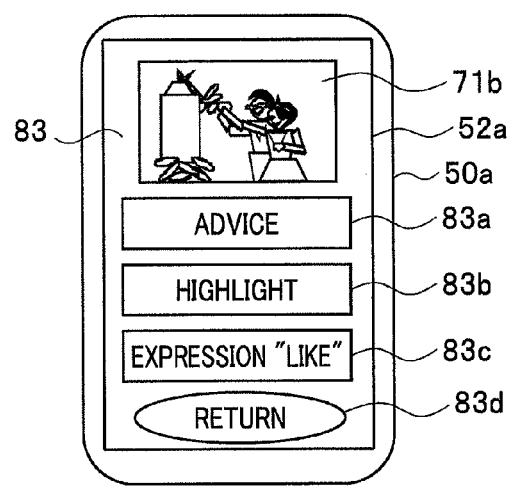
FIG. 6C is an explanatory diagram illustrating an example of a screen display in the second embodiment.

FIG. 6C is an explanatory diagram illustrating one example of a specific assistant display 83 that is displayed on the display screen 52a of the display section 52. In addition to the through image 71b, the assistant display 83 displayed on the display screen 52a includes an advice button 83a for providing photographing advice, a highlight button 83b for allowing a user to specify a preferred scene, an expression "like" button 83c for allowing a user to specify a preferred facial expression, and a button 83d for returning to the external camera mode display 82.

Here, it is assumed that the user 65 desires to provide photographing advice while viewing the through image 71b that is displayed on the display screen 52a. In this case the user 65 taps the advice button 83a on the assistant display 83. Thereupon, the display control section 51b displays an advice display 84 on the display screen 52a. Naturally, in this case the user 65 may not only provide advice, but may also assist the photographing operation. The user 65 may also send advice, and then assist the photographing operation if requested.

Figure 6D:
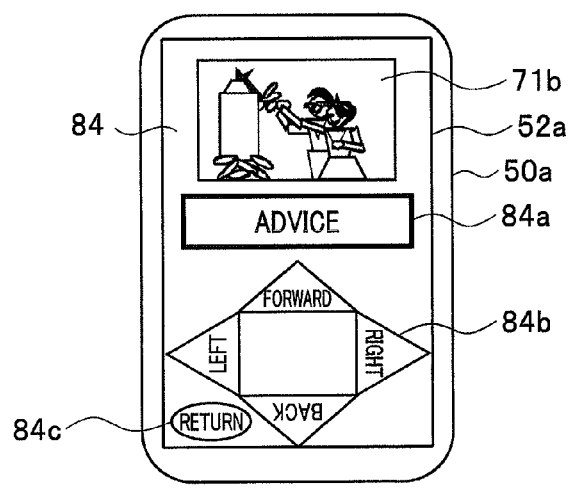
FIG. 6D is an explanatory diagram illustrating an example of a screen display in the second embodiment.

FIG. 6D is an explanatory diagram illustrating an example of the advice display 84 that is displayed on the display screen 52a of the display section 52. The advice display 84 that is displayed on the display screen 52a includes the through image 71b, a display 84a that shows that the current mode is the advice mode for photographing, switches 84b for instructing the content of advice, and a button 84c for returning to the assistant display 83. The switches 84b include direction keys for moving the photographing range in the forward, rearward, left and right movement directions.

For example, it is assumed that, while viewing the through image 71b that is displayed on the display screen 52a, the user 65 desires to change the photographing range to the left side so as to photograph the left side more than in the current photographing range. In this case, the user 65 taps the "Left" key among the switches 84b.

Naturally, various other kinds of photographing advice are possible apart from such advice regarding moving the photographing range. For example, as advice regarding photographing parameters there may be mentioned advice relating to image processing such as white balance, art filters, and special image processing including special optical observation that facilitates observation, and photographing parameters that the image pickup section is solely responsible for such as focus (focal position), angle of view (focal distance), and exposure control (aperture value, electronic shutter speed, ISO speed, exposure correction value). Naturally, it is also possible to substitute image processing for these kinds of processing that have similar effects. That is, a feature of the present invention is that an image pickup apparatus including a transmission section that transmits images in which information which identifies each of the relevant image frames is added to image frames obtained from an image pickup section also includes a reception section, and the reception section receives editing information for instructing editing of a frame of a specific image among the aforementioned series of image frames that is information which specifies a specific image. In addition, by means of the record/playback control section 11a, in accordance with the aforementioned editing information, a photographed image (frame) can be identified and edited and subjected to image processing. Further, a modification may be adopted in which the image pickup apparatus includes a photographing parameter control section that carries out photographing parameter control.

In step S29 that follows step S28, the editing point control section 51d determines whether or not an instruction has been made to transmit advice, and depending on an operation of the switches 84b performed by the user, the editing point control section 51d shifts the processing to step S30 to cause advice information that is editing information to be transmitted by unicasting to the image pickup apparatus 40 by the first communication section 55a. Note that, in consideration of a case where an edited moving image is generated based on information from a plurality of the information terminal apparatus 50 that is transmitted to a single image pickup apparatus 40, the editing point control section 51d also simultaneously transmits editor information and operation time information. Further, the first communication section 55a disconnects the communication with the image pickup apparatus 40 after transmitting the advice information to thereby enable communication between other information terminal apparatuses 50 and the image pickup apparatus 40.

Note that unicasting transmits data to a designated specific transmission destination party, and therefore by using unicasting it is possible to perform specific communication that is accompanied by confirmation of definite two-way communication. Further, the transmission of advice or the like is not carried out continuously, but rather is sporadic and does not occupy the communication line. Hence, it is possible to receive advice from a large number of devices using time periods when the communication line is open. In the case of broadcasting or multicasting in which data can be received by a large number of devices, it is possible for unexpected control, interference or the like to arise, however in a case where the utilization scene is one that allows such control, interference or the like, it is not necessary to limit the communication to unicasting.

In step S7 that follows step S6, the editing processing section 41c of the image pickup apparatus 40 determines whether or not there is advice information, and in step S8 the editing processing section 41c receives the advice information through the first communication section 44a and provides the advice information to the control section 41. The editing processing section 41c causes a display that is in accordance with the contents of the advice information to be displayed on the display screen 47a of the display section 47. Note that, in a case where photographing has not started at the stage at which the control section 41 receives advice information, the control section 41 may be configured to automatically start photographing upon receiving the advice information.

Figure 7A:
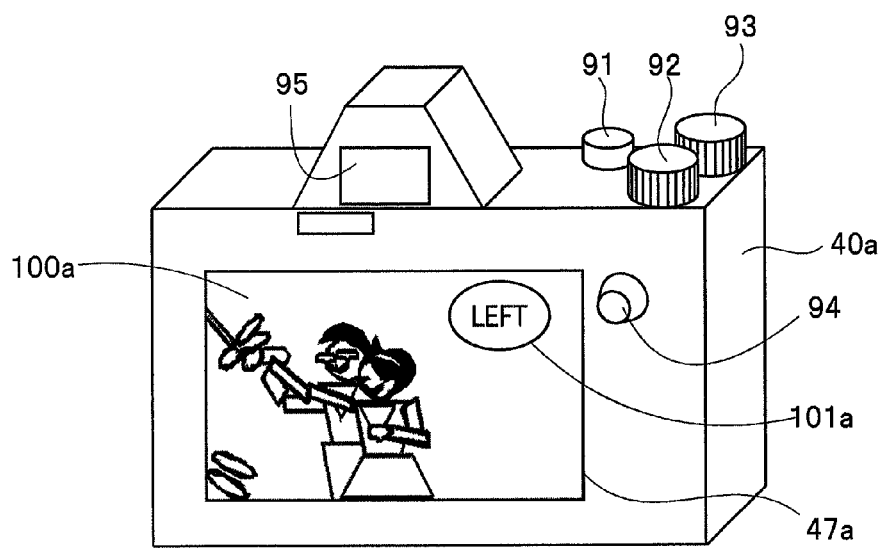
FIG. 7A is an explanatory diagram illustrating an example of a screen display.

FIG. 7A is an explanatory diagram illustrating an example of the screen display in this case. In the example illustrated in FIG. 7A, in addition to a shutter button 91, operation sections 92 to 94 such as dials or buttons are provided on the case 40a of the image pickup apparatus 40. A viewfinder 95 is also provided in the image pickup apparatus 40.

In the example illustrated in FIG. 7A, advice 101a that is based on advice information is displayed on a through image 100a that is displayed on the display screen 47a. The advice 101a is advice that is displayed as a result of the user 65 performing an operation on the "Left" key among the switches 84b on the advice display 84 on the information terminal apparatus 50, and by means of the characters "Left" that are displayed on the display screen 47a it is understood that the user 65 wants the user 61 who is the photographer to photograph the left side.

If the editing point control section 51d of the information terminal apparatus 50 determines in step S29 that an instruction to transmit advice was not given, in the subsequent step S31, the editing point control section 51d determines whether or not an instruction was given to perform "like" communication. It will be assumed here that the user 65 taps the highlight button 83b on the assistant display 83 shown in FIG. 6C. The highlight button 83b is a button for allowing the user to specify a preferred scene. Upon the user performing an operation with respect to the highlight button 83b, the editing point control section 51d controls the display control section 51b to cause a highlight display 85 shown in FIG. 6E to be displayed on the display screen 52a.

Figure 6E:
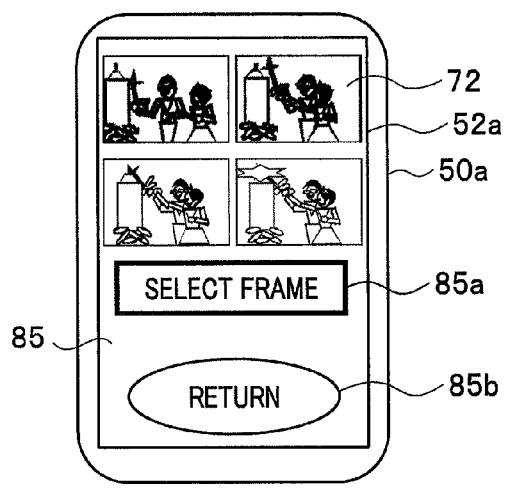
FIG. 6E is an explanatory diagram illustrating an example of a screen display in the second embodiment.

FIG. 6E is an explanatory diagram illustrating one example of the highlight display 85 that is displayed on the display screen 52a of the display section 52. The highlight display 85 displayed on the display screen 52a includes a thumbnail display 72 composed of a plurality of frames based on a through image, a selection button 85a for selecting a frame to designate as an editing point, and a button 85b for returning to the assistant display 83.

By means of the thumbnail display 72, the editing point control section 51d displays images of four frames that include not only the frame that was photographed at the time point at which the highlight button 83b was operated, but also the three frames prior to the aforementioned frame (step S32). The user 65 specifies an editing point by tapping on a desired image among the thumbnail display 72 that is being displayed. After tapping an image on the thumbnail display 72, the user 65 taps the selection button 85a. As a result, the editing point control section 51d generates editing information (in this case, "like" information) that includes frame information of the image ("like" frame) that the user 65 specified, and causes the editing information to be transmitted to the image pickup apparatus 40 through the first communication section 55a (step S33).

In this case also, the editing point control section 51d causes editor information and operation time information to be transmitted simultaneously with the editing information, and the first communication section 55a disconnects the communication with the image pickup apparatus 40 after transmitting the information. Note that, in step S34 that follows step S33, the control section 51 determines whether or not a return operation is performed. If a return operation is performed, the control section 51 returns the processing to step S21 to display the mode display, while if a return operation is not performed, the control section 51 returns the processing to step S24 to repeat the processing of step S24 to step S33.

In step S9 that follows step S8, the editing processing section 41c of the image pickup apparatus 40 determines whether or not there is editing information such as "like" information to be received, and in step S10 the editing processing section 41c receives the editing information through the first communication section 44a and provides the editing information to the control section 41. The editing processing section 41c causes a display that is in accordance with the contents of the editing information to be displayed on the display screen 47a of the display section 47. Note that, in a case where photographing has not started at the stage at which the control section 41 receives editing information, the control section 41 may be configured to automatically start photographing upon receiving the editing information.

Figure 7B:
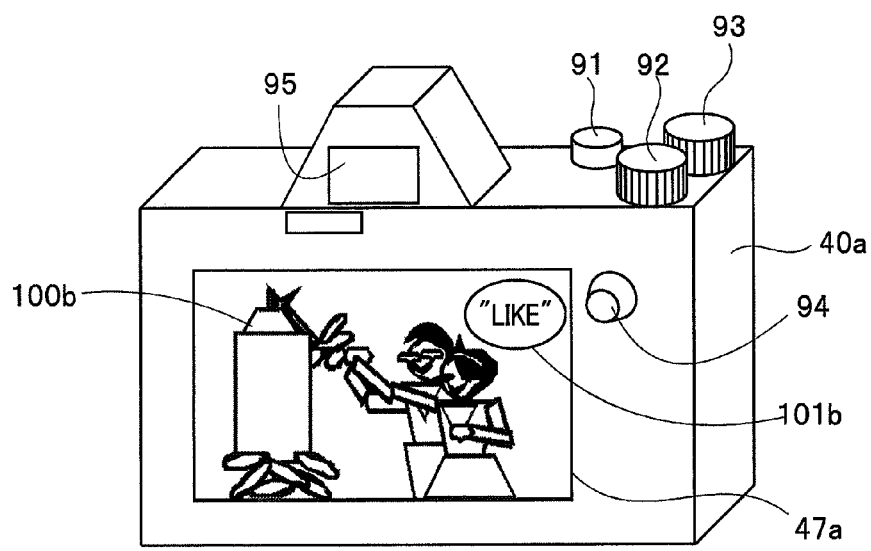
FIG. 7B is an explanatory diagram illustrating an example of a screen display.

FIG. 7B is an explanatory diagram illustrating an example of the screen display in this case. In the example illustrated in FIG. 7B, a "like" display 101b that is based on "like" information is displayed on the through image 100b that is displayed on the display screen 47a. By means of the "like" display 101b, the user 61 who is the photographer can know that someone operating one information terminal apparatus 50 likes the scene that is currently being photographed, and strives to maintain the cumin photographing range and pays attention to the focusing operation. It can be expected that this kind of display will increase the motivation of the photographer to concentrate on the photographing operations.

The editing processing section 41c controls the record control section 41b to add and record editing information in association with the image of the frame specified as a "like" frame. In step S 11, the control section 41 determines whether or not an operation to start photographing or an operation to end photographing has been performed. If neither of these operations has been performed, the control section 41 returns the processing to step S1, and repeats the processing from step S1 to step S10.

The editing processing section 41c may not only add editing information to an image to be recorded and record the added editing information with the image, but may also perform editing based on editing information with respect to an image to which editing information was added, and record the edited image. For example, the editing processing section 41c may be configured to, while picking up a moving image, subject an image to which editing information was added to still image recording in accordance with editing information that specifies still image recording. Further, the editing processing section 41c may generate an image for a predetermined period that includes editing information, for example, a highlight moving image composed of images of several frames before and after a "like" frame, and record the generated image as a "like" file in the recording section 43. The "like" file is a moving image that is obtained as a result of a plurality of users who operate respective information terminal apparatuses 50 specifying their own preferred scenes or the like, and it is possible to record a moving image that reflects the preferences of the users who share the moving image, without the photographer who operates the image pickup apparatus 40 performing any kind of editing operation.

When an operation to start or end photographing is performed, in step S12 the control section 41 starts or ends photographing. When ending photographing, the control section 41 compresses the image that is being recorded to generate an image file.

Note that, although omitted from the flowcharts in FIG. 3 and FIG. 4, in some cases the expression "like" button 83e is operated when displaying the assistant display 83. At the image pickup apparatus 40, when moving image photographing is started, by performing image analysis processing with respect to the picked-up images, the image analysis section 41e of the control section 41 performs an analysis of the scene and makes judgements with respect to people in the images, judgement with respect to facial expressions and the like, and records the judgement results in association with each frame of the moving image.

When the user 65 who operates the information terminal apparatus 50 operates the expression "like" button 83c, the editing point control section 51d generates editing information (in this case, expression "like" information) including frame information specifying the frame that is displayed at the time point of the relevant operation, and transmits the editing information to the image pickup apparatus 40 by means of the first communication section 55a.

The editing information is supplied to the editing processing section 41c, and the editing processing section 41c adds editing information corresponding to the operation of the expression "like" button 83c to the image of the frame specified by the frame information. For example, in a case where the facial expressions of a person in each image are ranked by the image analysis section 41e and the ranking information is recorded in association with the respective images, it is also possible for the editing processing section 41c to select and output the ranking that corresponds to the image of the frame specified by the expression "like" information and an image in which a person is included that corresponds to the same ranking, (Time of Playback)

Figure 8:
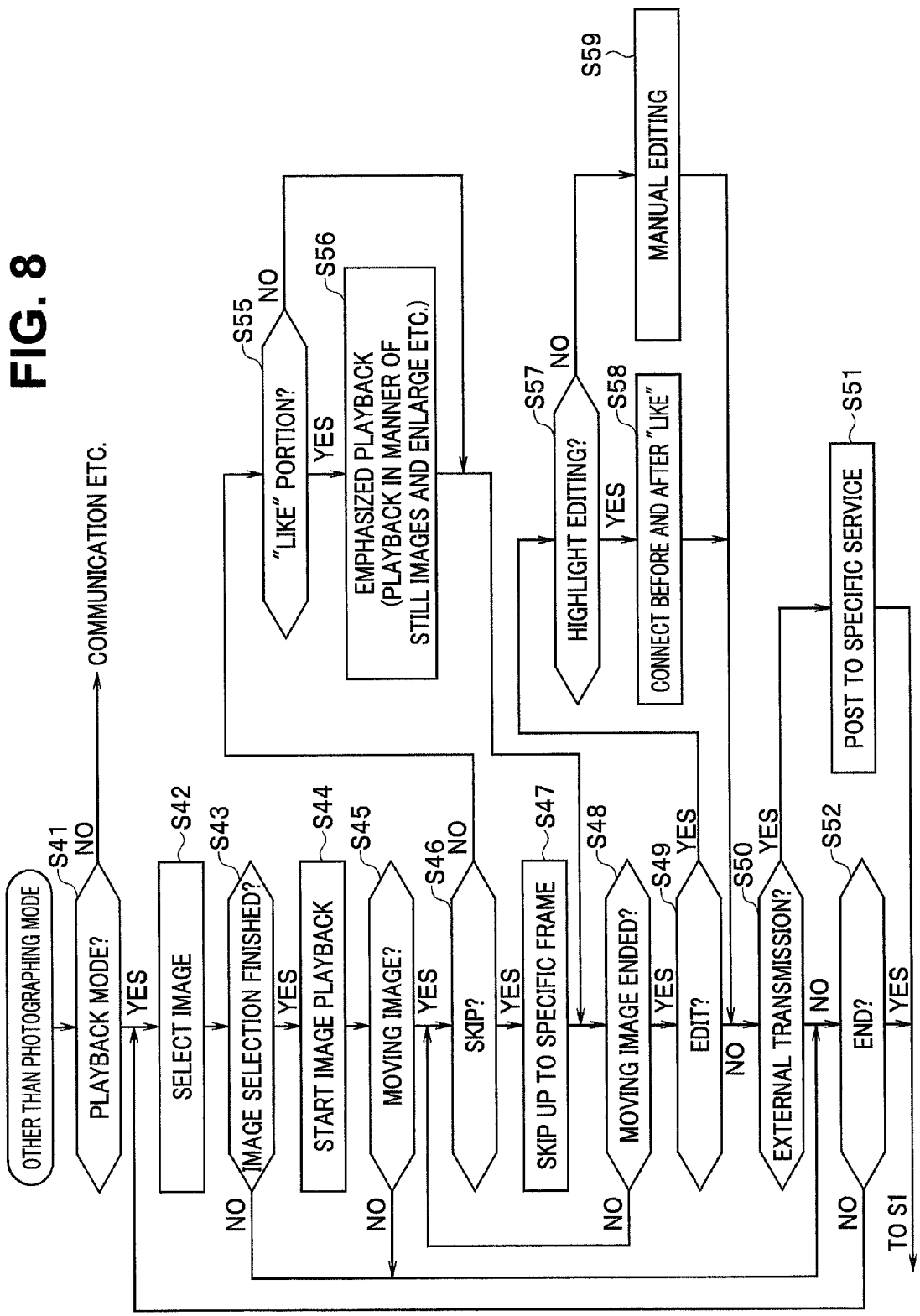
FIG. 8 is a flowchart illustrating operations in a playback mode of an image pickup apparatus 40.

FIG. 8 is a flowchart showing operations in a playback mode of the image pickup apparatus 40.

In step S41 in FIG. 8, the control section 41 determines whether or not the playback mode is designated. If the playback mode is not designated, the control section 41 transitions to another mode that is designated. If the playback mode is designated, in step S42, the control section 41 accepts the selection of an image to be played back. In step S43, the control section 41 determines whether or not selection of an image is completed, and if selection of an image is not completed, the control section 41 shifts the processing to step S52 to determine whether or not an end operation has been performed. If the user specifies a playback image, the control section 41 determines that image selection is completed, and shifts the processing to step S44 to start image playback.

In step S45, the control section 41 determines whether or not the playback image is a moving image. In a case where the playback image is a still image, the control section 41 shifts the processing to step S52 to make a determination regarding whether or not the end operation has been performed. If the playback image is a moving image, in the next step S46, the control section 41 determines whether or not a skip operation is performed.

If the user performs a skip operation, the control section 41 shifts the processing from step S46 to step S47 to skip the frames up to a specific frame, and in step S48 the control section 41 determines whether or not the moving image ended. If the moving image has not ended, the control section 41 returns the processing from step S48 to step S46 to determine whether or not a skip operation is performed. If a skip operation is not performed, the control section 41 shifts the processing from step S46 to step S55 to determine whether or not a frame with which "like" information is associated is played back. If a frame with which "like" information is associated has not been played back, the control section 41 shifts the processing from step S55 to step S48 to determine whether or not the moving image ended.

It is assumed here that a frame with which "like" information is associated is played back during such kind of playback of a moving image. Upon the aforementioned frame being played back, the control section 41 shifts the processing from step S55 to step S56 to perform emphasized playback. A frame with which "like" information is associated is a preferred scene of the user who operates the information terminal apparatus 50, and for example, an emphasized display is performed with respect to the relevant image by playing back the image in the manner of a still image or by displaying the image in an enlarged manner or the like. By this means, the user who specified the "like" information can view the moving image while enjoying their own preferred scene(s).

Note that editor information and operation time information are also associated with the frame together with the "like" information, and the control section 41 can also perform emphasized playback with respect to only preferred scenes of predetermined users based on the editor information.

When the control section 41 determines in step S48 that the moving image has ended, in the next step S49 the control section 41 determines whether or not the edit mode is specified, and in step S50 determines whether or not external transmission is specified. If the control section 41 determines that neither the edit mode nor external transmission are specified in steps S49 and S50, respectively, the control section 41 shifts the processing to step S52 to determine whether or not the end operation has been performed.

If the control section 41 determines in step S49 that the edit mode is specified, the control section 41 shifts the processing to step S57 to determine whether or not highlight editing is specified. If highlight editing is not specified, in the next step S49 the control section 41 transitions to the normal manual edit mode and accepts a manual edit operation by the user.

If the control section 41 determines in step S57 that highlight editing is specified, in the subsequent step S58, the control section 41 performs editing using editing information. For example, the editing processing section 41c gathers together images that were picked up in a predetermined time period around the time of the image of the frame with which "like" information is associated that include the relevant frame with which the "like" information is associated, and generates a moving image using the images. In this case, a moving image that is a collection of highlights in which only images within a predetermined period close to the timing of the image with which the "like" information is associated are connected is generated. Further, in this case also, by using editor information, a moving image that is a collection of highlights in which preferred scenes of only a specific user are gathered together may be generated.

Figure 9:
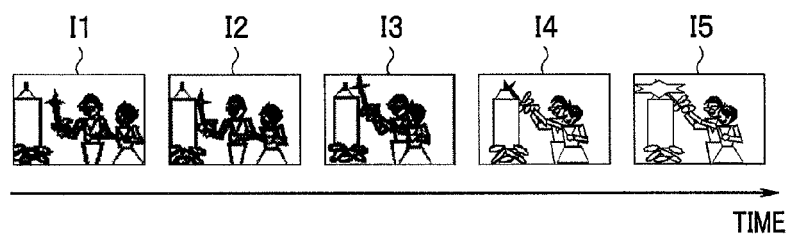
FIG. 9 is an explanatory diagram for describing highlight editing.
Figure 10:
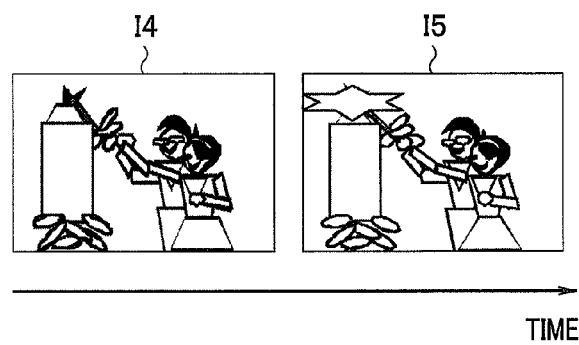
FIG. 10 is an explanatory diagram for describing highlight editing.

FIG. 9 and FIG. 10 are explanatory diagrams for describing highlight editing. In FIG. 9, images I1, I2, ... of a series of frames obtained by moving image photographing are illustrated, in which the horizontal axis represents the time axis. It is assumed here that, for example, "like" information is associated, to an image I4 by the user who operates one information terminal apparatus 50. In this case, the editing processing section 41c, for example, adopts images composed of two frames that include the image of the frame with which the "like" information is associated, as the movie after editing. FIG. 10 illustrates the movie in this case, in which the edited movie is composed of only the images I4 and I5.

The moving image that is generated by the editing in step S58 is a moving image based on "like" information that is added as a result of respective users that operate the information terminal apparatuses 50 performing an operation at the timing of preferred scenes of the respective users, and is a collection of highlights generated by gathering together only the preferred scenes of the respective users. By performing the simple operation of tapping on the highlight button 83b, each user can specify their own preferred scenes) as an editing point, and can simultaneously perform an edit operation while enjoying the wedding ceremony. The edited moving image is recorded in the recording section 43 by means of the record control section 41b.

In step S50, if the control section 41 determines that external transmission is specified, the control section 41 shifts the processing to step S51 to post the recorded movie or still images to a specific service. If the control section 41 determines that the posting processing in step S51 has ended, or that the end operation was performed in step S52, the control section 41 returns the processing to step S1 in FIG. 3.

(External Server)

Figure 11:
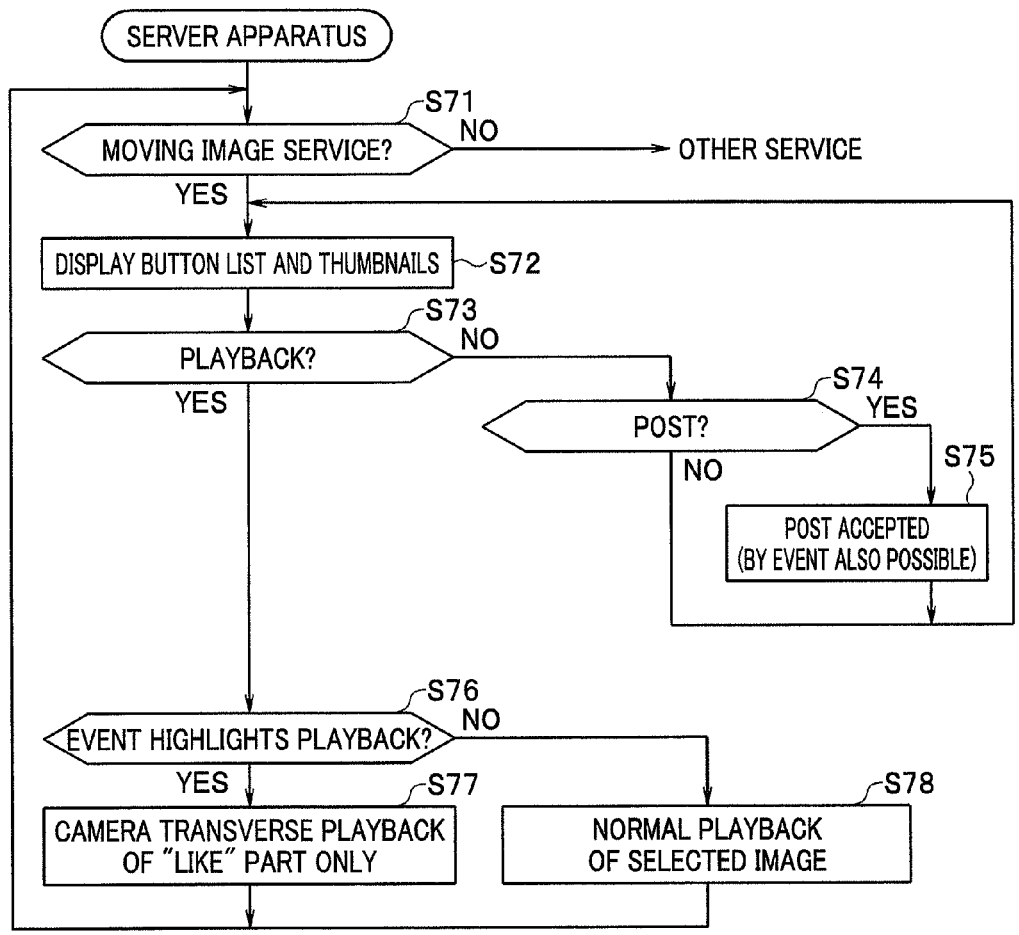
FIG. 11 is a flowchart for describing operations at an external server 31.

FIG. 11 is a flowchart for describing operations at the external server 31.

In step S71, the external server 31 makes a determination regarding whether or not the specified service is a moving image service. If the specified service is not a moving image service, the external server 31 executes another service that is specified. If a moving image service is specified, in step S72 the external server 31 displays a list of buttons or thumbnails for designating the service, and in step S73 determines whether or not playback has been instructed.

If playback has not been instructed, the external server 31 shifts the processing from step S73 to step S74 to determine whether or not there is a post. If there is no post, the external server 31 returns the processing from step S74 to step S72, while if there is a post, the external server 31 accepts the post (step S75). Note that the external server 31 can also accept posts for each event. By this means, for example, posts from a plurality of image pickup apparatuses that are acquired with respect to the same event can be stored, for example, inside a related folder as posts that relate to the same event.

If the external server 31 determines in step S73 that playback is instructed, the external server 31 shifts the processing to step S76 to determine whether or not the playback of event highlights is specified. If playback of event highlights is not specified, in the subsequent step S78, the external server 31 performs normal playback of the selected image.

If the external server 31 determines in step S76 that playback of event highlights is specified, in the subsequent step S77 the external server 31 performs playback while editing using editing information. For example, the external server 31 gathers together images acquired in a predetermined time period around the time of an image of a frame with which "like" information is associated that includes the image of the frame with which the "like" information is associated, and generates a moving image. Further, in a case where a plurality of movies are posted with respect to the relevant event, by using the operation time information with respect to the plurality of posts, the external server 31 performs transverse playback of the respective posts while temporally connecting only images in a predetermined period close to the timing of the image with which "like" information is associated.

Figure 12:
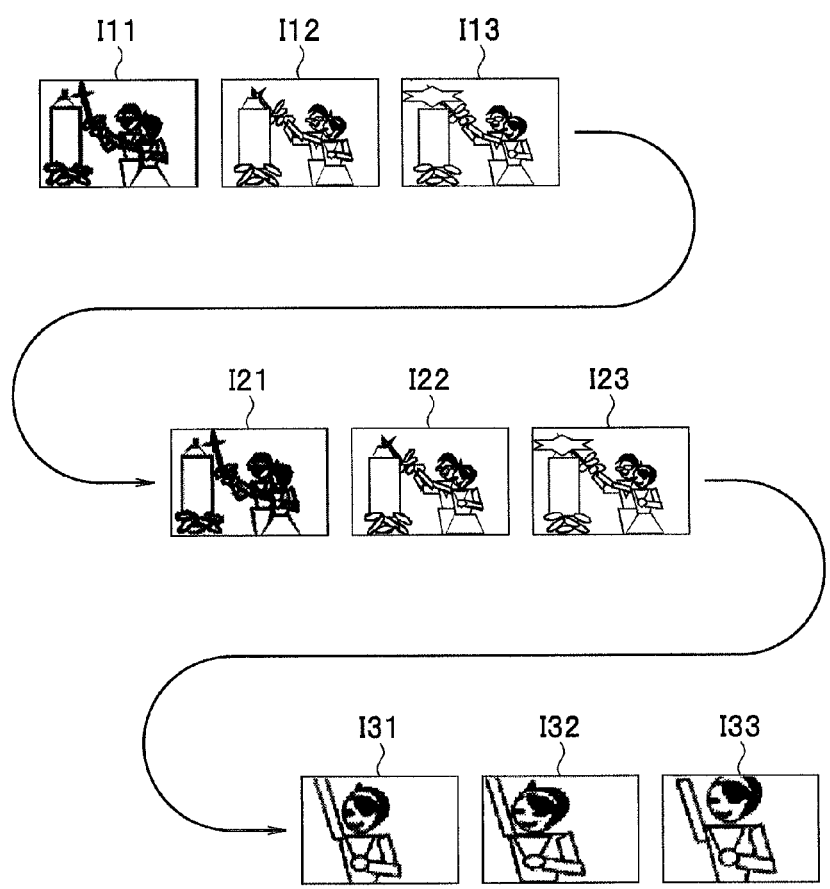
FIG. 12 is an explanatory diagram for describing transverse playback.

FIG. 12 is an explanatory diagram for describing transverse playback. In the example illustrated in FIG. 12, with respect to three movies for which images were picked up and posted by three image pickup apparatuses 40, portions of movies to which "like" information was added in the same period of time are extracted and subjected to transverse playback.

Images I11 to I13 represent an image I12 to which "like" information was added and images I11 and I13 of two frames which come before and after the image I12, which are three images acquired by a first image pickup apparatus 40. Similarly, images I21 to I23 represent an image I22 to which "like" information was added and images I21 and I23 of two frames which conic before and after the image I22, which are three images acquired by a second image pickup apparatus 40. Likewise, images I31 to I33 represent an image I32 to which "like" information was added and images I31 and I33 of two frames which come before and after the image I22, which are three images acquired by a third image pickup apparatus 40.

These images are images that were acquired in the same period of time, and the external server 31 extracts, in earlier time order, predetermined frames based on "like" information from the three posted images, and plays back the images in succession. That is, in the example in FIG. 12, the images I11 to I13, I21 to I23, and I31 to I33 are played back in succession.

Thus, with respect to moving images that are picked up by a plurality of image pickup apparatuses also, by using editing information that users who view the moving images specify themselves, a movie that each user desires can be easily generated.

Further, as described above, parameter changing, adjustment and edit processing may be performed by the image pickup apparatus 40, or may be performed by an external device when capable of such processing. If an image to which editing information is added can be outputted from the image pickup apparatus 40, it is possible to perform edit processing in a short time by using the editing information at an external device. Here, the parameters are not limited to image processing parameters such as white balance, art filters, and special image processing including special optical observation that facilitates observation, and the parameters may be photographing parameters that the image pickup section is solely responsible for such as focus (focal position), angle of view (focal distance), and exposure control (aperture value, electronic shutter speed, ISO speed, exposure correction value). Naturally, it is also possible to substitute image processing for these kinds of processing that have similar effects.

Thus the present embodiment can obtain a moving image that has variation and charm by, for example, adding editing information indicating an editing point at the timing of a preferred scene during moving image photographing, and performing editing utilizing the editing information. In this case, the present embodiment makes it possible to allow an operator of an information terminal apparatus other than the photographer of the moving image to add editing information. By this means, in the present embodiment the photographer of the moving image can be allowed to concentrate on performing the moving image photographing operations, and the occurrence of camera-shake that accompanies operation of an operation member for settings parameters or the like as well as the occurrence of mistakes due to a lapse in concentration can be prevented, thereby facilitating the achievement of ideal framing and the like. Further, by making it possible for one or more users who view or observe a moving image after editing to add editing information or summary information with a simple operation by means of an information terminal apparatus that the respective users operate, the present embodiment obtains a moving image or image that has excellent viewability and observability which reflect the preferences and the like of the users who view the moving image.

Although the above embodiments are described using a digital camera as a device for picking up images, the camera may be a digital single-lens reflex camera or a compact digital camera, or may be a camera for moving images such as a video camera or a movie camera, or may be a camera built into a personal digital assistant (PDA) such as a cellular phone or a smartphone.

It need scarcely be said that, besides the above described consumer-type uses, the present invention is also effective for image acquisition in the field of science and the field of medical treatment in which movements and changes are observed and examined. Framing also is not necessarily limited to photographing performed while manually holding the image pickup apparatus, and is a concept that also includes photographing performed while moving the image pickup apparatus using a stage, a robot, a drone or the like. That is, the contrivance of the present application will be extremely important in such a case, since it is necessary to concentrate on the movement or image pickup operations.

The present invention is not limited to the precise embodiments described above, and can be embodied in the implementing stage by modifying the components without departing from the scope of the invention. For example, portions for which a plurality of persons is assumed may each be replaced with various mobile devices (robots, drones and the like) as mentioned above or with artificial intelligence. Also, various inventions can be formed by appropriately combining a plurality of the components disclosed in the respective embodiments described above. For example, some components may be deleted from among all of the components that are disclosed in the embodiments. Furthermore, components from different embodiments may be appropriately combined.

Note that, even when words such as "first" and "next" are used for convenience in the description of operation flows in the patent claims, the specification, and the drawings, this does not mean that implementation must be performed in such sequence. Further, with respect to portions that do not affect the essence of the invention, naturally respective steps constituting these operation flows can also be appropriately omitted.

Furthermore, among the technology that is described herein, many controls or functions that are described mainly using a flowchart can be set by means of a program, and such programs may be stored on a recording medium or in a recording section. The manner of recording the programs to the recording medium or recording section may be to record the programs at the time of product shipment, or a distributed recording medium may be utilized, or the programs may be downloaded via the Internet.

[Supplementary Note 1]

An image pickup apparatus including:

an image pickup section, a transmission section configured to transmit image frames obtained from the image pickup section and images to which information identifying the respective image frames is attached, a reception section configured to receive editing information for instructing editing of a specific image frame among the series of images frames, the editing information including information specifying the specific image, and a photographing parameter control section configured to perform photographing parameter control with respect to the image pickup section in accordance with the editing information.

[Supplementary Note 2]

A non-transitory computer-readable recording medium on which is recorded an information processing program for causing a computer to execute:

a step of acquiring a series of images by picking up images;

a step of attaching information that identifies each image to the series of images that are acquired and transmitting the series of images;

a step of receiving the series of images that are transmitted;

a step of generating editing information for instructing editing of a specific image among the series of images that are received, the editing information including information specifying the specific image;

a step of transmitting the editing information;

a step of receiving the editing information that is transmitted; and a step of recording the editing information that is received, in association with the picked-up series of images.

What is claimed is:

1. An information processing system, comprising:
    an image pickup apparatus comprising:
        an image pickup device configured to acquire a series of images by picking up images,
        a first transmitter configured to resize the series of images that the image pickup device acquires to reduce the amount of transmission of data, generate a series of resized images, attach information identifying each image to the series of resized images, and transmit the series of resized images;
        a first receiver configured to receive editing information for instructing editing of at least one specific image among the series of resized images, the editing information including information specifying the at least one specific image; and
        an editor configured to record the series of resized images that are picked up and to edit the at least one specific image based on the editing information; and
    an information terminal apparatus comprising:
        a second receiver configured to receive the series of resized images that the first transmitter transmits;
        a display configured to display images corresponding to the series of resized images received;
        an input instrument configured to receive input information for deciding at least one image of the displayed images as an editing point;
        an editing point control processor configured to set at least one image of the series of resized images as the specific image, the at least one image corresponding to the at least one image displayed decided as the editing point, and generate the editing information for instructing editing of the at least one image set as the specific image; and
        a second transmitter configured to transmit the editing information to the first receiver.

2. The information processing system according to claim 1, comprising:
    one or more of the image pickup apparatus; and
    one or more of the information terminal apparatus.

3. The information processing system according to claim 1, wherein:
    the first transmitter transmits the series of resized images by broadcasting; and
    the second transmitter transmits the editing information by unicasting.

4. The information processing system according to claim 1, wherein
    the information terminal apparatus comprises a plurality of information terminal apparatuses,
    the editing information comprises a plurality of pieces of editing information,
    the specific image comprises a plurality of specific images,
    the first receiver is configured to receive the plurality of editing information corresponding to the plurality of information terminal apparatuses, and
    the editor is configured to edit the plurality of specific images based on the plurality of pieces of editing information corresponding to the plurality of information terminal apparatuses.

5. The information processing system according to claim 4, wherein
    the editor is configured to edit the series of images based on all of the plurality pieces of editing information corresponding to the plurality of information terminal apparatuses to create one moving image.

6. The information processing system according to claim 4, wherein
    the second transmitter is configured to transmit the plurality of editing information by attaching information for identifying each of the information terminal apparatuses to each of the plurality of editing information,
    the editor is configured to edit the series of images based on the editing information of each of the plurality of information terminal apparatuses, to generate moving images corresponding to the plurality of information terminal apparatuses.

7. An information processing method, comprising:
    acquiring a series of images;
    resizing the series of images to reduce the amount of transmission of data and generating a series of resized images;
    attaching information identifying each image to the series of resized images;
    transmitting the series of resized images with the identification information via a first transmitter;
    receiving the series of resized images that are transmitted via a first receiver;
    displaying images corresponding to the series of resized images received on a display;
    receiving input information for deciding at least one image of the displayed images as an editing point via an input instrument;
    setting at least one image of the series of resized images as a specific image, the at least one image corresponding to the at least one image displayed decided as the editing point;
    generating editing information for instructing editing of the at least one specific image among the series of resized images that are received using a processor, the editing information including information specifying the at least one image set as the specific image;
    transmitting the editing information via a second transmitter;
    receiving the editing information that is transmitted via a second receiver; and
    recording the editing information that is received, in association with the series of resized images, and editing the at least one specific image based on the editing information on an editor.

8. The information processing method according to claim 7, further comprising:
    displaying an emphasized display using the editing information when playing back the recorded series of images.

9. The information processing method according to claim 7, further comprising:
    generating an edited moving image by means of images of a predetermined period including the at least one specific image using the editing information when editing the recorded series of resized images.

10. A non-transitory computer-readable recording medium on which is recorded an information processing program for causing a computer to execute:
  acquiring a series of images by picking up images using an imaging device;
  resizing the series of images to reduce the amount of transmission of data and generating a series of resized images;
  attaching information identifying each image to the series of resized images;
  transmitting the series of resized images with the identification information via a first transmitter;
  receiving the series of resized images that are transmitted via a first receiver;
  displaying images corresponding to the series of resized images received on a display;
  receiving input information for deciding at least one image of the displayed images as an editing point via an input instrument;
  setting at least one image of the series of resized images as a specific image, the at least one image corresponding to the at least one image displayed decided as the editing point;
  generating editing information for instructing editing of the at least one specific image among the series of resized images that are received using a processor, the editing information including information specifying the at least one image set as the specific image;
  transmitting the editing information via a second transmitter;
  receiving the editing information that is transmitted via a second receiver; and
  recording the editing information that is received, in association with the series of resized images, and editing the at least one specific image based on the editing information on an editor.

11. An information processing system, comprising:
  an image pickup apparatus comprising:
    an image pickup device configured to acquire a series of images by picking up images;
    a first transmitter configured to resize the series of images that the image pickup device acquires to reduce the amount of transmission of data, generate a series of resized images, attach information identifying each image to the series of resized images, and transmit the series of resized images;
    a first receiver configured to receive editing information for instructing editing of at least one specific image among the series of resized images, the editing information including information specifying the at least one specific image; and
    a recorder configured to record the series of resized images that are picked up and to record the editing information in association with the at least one specific image; and
  an information terminal apparatus comprising:
    a second receiver configured to receive the series of resized images that the first transmitter transmits;
    a display configured to display images corresponding to the series of resized images received;
    an input instrument configured to receive input information for deciding at least one image of the displayed images as an editing point;
    an editing point control processor configured to set at least one image of the series of resized images as the specific image, the at least one image corresponding to the at least one image displayed decided as the editing point, and generate the editing information for instructing editing of the at least one image set as the specific image without editing the series of resized images that are received; and
    a second transmitter configured to transmit the editing information to the first receiver.

12. The information processing system according to claim 11, wherein:
  the recorder is configured to edit the at least one specific image based on the editing information.

* * * * *